Dec. 17, 1968 J. O. LAMPKIN, JR 3,417,373

IDENTIFICATION CIRCUIT

Filed Feb. 12, 1964 4 Sheets-Sheet 1

INVENTOR.
JOHN O. LAMPKIN, JR.

BY J. T. Comfort
ATTORNEY

INVENTOR.
JOHN O. LAMPKIN, JR.
BY
J. T. Comfort
ATTORNEY 3,417,373
IDENTIFICATION CIRCUIT
John O. Lampkin, Jr., Roanoke, Va., assignor to General Electric Company, a corporation of New York
Filed Feb. 12, 1964, Ser. No. 344,357
3 Claims. (Cl. 340—172.5)

ABSTRACT OF THE DISCLOSURE

A circuit for identifying one of a pair of predetermined binary numbers in a magnetic core shift register where the numbers differ by one bit. Identification circuits are connected to all bits except the differing bit. A resetting circuit is connected to the differing bit and to the identification circuits. Following the shift of a binary number into the register, a shift-responsive circuit briefly connects the register to the identification circuits which may set in response to the predetermined configuration of all bits except the differing bit. The resetting circuit responds to the value of the differing bit to reset the first or the second identification circuit accordingly.

This invention relates to apparatus for identifying predetermined identification numbers, and more particularly to identifying predetermined identification numbers from magnetic core shift registers.

In material handling systems such as mailbag handling systems, and freight house handling systems, the specific objects are identified as to their destination with an identification code at the point of origin. The objects such as mailbags or freight carts are then moved on a sorting line past a plurality of destination stations, and the identification code is shifted in synchronism in a magnetic core shift register with the movement of the objects on the sorting line. The identification codes must be read as the objects pass each destination station to determine if an object is to be diverted at that destination station. It is desirable to have the identification code read by a plurality of reading apparatus at each destination station to control the diversion of the object to either side of the sorting line. It is also important that the magnetic cores not be overloaded by the reading apparatus.

It is therefore an object of this invention to provide new and improved apparatus for identifying predetermined identification numbers.

It is another object of this invention to provide new and improved apparatus for identifying more than one predetermined identification number.

Another object of this invention is to provide new and improved apparatus for identifying predetermined identification numbers from magnetic core shift registers.

Still another object of this invention is to provide new and improved apparatus for identifying predetermined identification numbers from magnetic core shift registers without overloading the cores.

Very briefly then, a circuit is provided for identifying a predetermined binary number. The identification circuit loads the magnetic core shift register for only a predetermined period of time. The connection is responsive to the shifting of the binary numbers in the magnetic core shift register so that the loading to the identification circuit is carried out right after the shift of the binary numbers.

The invention is set forth with particularity in the appended claims. The principles and characteristics of the invention, as well as other objects and advantages are revealed and discussed in the specification and drawings which follow.

Figure 1:
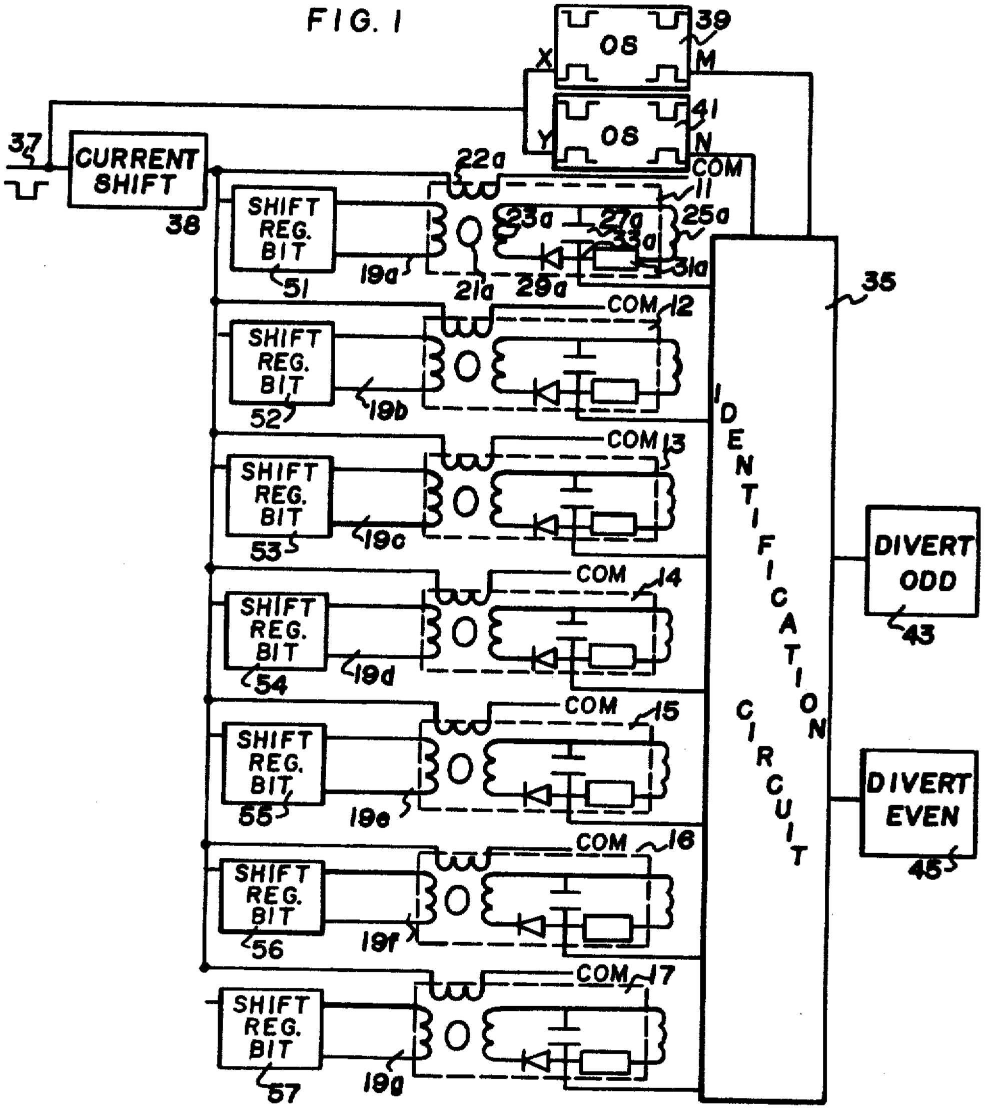
FIGURE 1 shows the identification apparatus of this invention used in an article identification system.

Referring first to FIGURE 1, a plurality of shift register bits 11–17 contain the seven bits of a binary number. The shift register bits are each one bit of a one core per bit magnetic core shift register. One core per bit magnetic core shift registers are well known in the art. Each of the shift register bits are identical, and labeled accordingly. Shift register 11 for instance has an input coil 19*a*, a magnetic core 21*a*, a shift coil 22*a*, an output coil 23*a*, a capacitor 27*a* across the output coil 23*a*, and a diode 29*a* between the capacitor and the output coil. An input coil 25*a* for the next shift register bit is also connected across the capacitor 27*a*. A resistor 31*a* is connected between the capacitor and the input coil 25*a* for the next shift register bit.

An output terminal 33*a* is connected to the identification circuit 35. In shift register bits 12–17 the same numerical designation s are used, the corresponding elements, followed by different alphabetical designations wherever the elements are labeled.

Each of the output terminals is connected to an identification circuit 35.

A shift pulse is applied to terminal 37 when the contents of the shift register bits are to be shifted to the subsequent shift register bits. The shift pulse from terminal 37 is applied directly to terminal *x* of one shot 39 and terminal *y* of one shot 41. One shot 39 produces a 13 microsecond positive signal on its *m* output terminal on the positive going side of a signal applied to its *x* terminal. One shot 41 produces a 25 microsecond positive signal on the positive going side of a signal applied to its *y* terminal. The signals produced by one shots 39 and 41 are applied to the identification circuit 35. The identification circuit 35 applies signals to the divert odd circuit 43 and the divert even circuit 45. The negative shift pulse from terminal 37 is applied to current shift circuit 38 which produces a current shift signal which is applied in series to shift coils of shift register bits 11–17.

Figure 2:
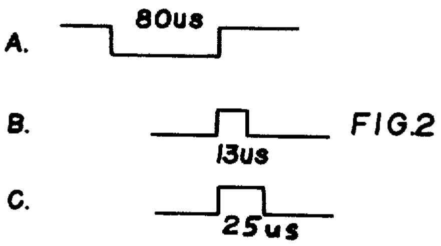
FIGURE 2 shows the signals used in controlling the identification apparatus.

A binary number is shifted into the magnetic cores 21*a*–21*g* from the preceding magnetic core shift register bits 51–57 by the input coils 19*a*–19*g*, by the application of the 80 microsecond shift signal (waveform as shown in FIGURE 2) to the shift coil of the preceding magnetic core shift register bits 51–57.

Capacitors in the shift register elements 11–17 are charged during the 80 microsecond shift pulse. At the end of the 80 microsecond shift pulse the positive going edge causes one shot 39 and one shot 41 to apply 13 and 25 microsecond pulses, respectively, to the identification circuit 35.

The identification circuit 35 identifies one of two predetermined numbers and activates the divert odd circuit 43 or the divert even circuit 45 accordingly. The identification circuit 35 may also identify a special predetermined binary number and activate the divert odd circuit 43 or the divert even circuit 45 according to a preselection.

The identification is carried out during the 25 microsecond interval so that the magnetic cores are only loaded for a short period of time.

*Bits—Seven read circuit*

The inputs from the core shift register are applied to input terminals 101–107. A positive going read pulse is applied to terminal 100. Terminals 101–103 and 100 are connected through OR rectifiers 111–113 and 118 respectively, through resistor 119 to the base of pnp transistor 121. Input terminals 104–107 are connected through AND rectifiers 114–117 to point 123, which is connected to the collector of pnp transistor 121. The base of pnp transistor 121 is also connected through resistor 125 to a +6 volt bus 127. The emitter of pnp transistor 121 is connected to a grounded common bus 129. The collector of pnp transistor 121 is also connected through resistor 131 to a −18 volt common bus 133. The output from the collector of pnp transistor 121 at point 135 is connected through three rectifiers 137–139 to point 141, from point 141 through resistor 143 to the base of pnp transistor 145 and through resistor 147 to the base of pnp transistor 149.

To prevent loading of the cores the diodes are back biased. The negative signal applied to terminal 100 is more negative than the maximum output voltage of the shift registers so that the junction between diode 118 and resistor 119 is more negative than the shift register output to back bias diodes 111–113. When the signal applied to terminal 100 is negative, transistor 121 is turned on so that junction point 123 is positive and diodes 114–117 can only be forward biased by the application of negative signals to input terminals 104–107.

*Odd flip-flop*

Pnp transistors 145 and 146 form the odd flip-flop 144 and pnp transistors 149 and 150 form the even flip-flop 148. The base of pnp transistor 145 is connected through resistor 151 to a +6 volt common 127 and connected through resistors 153 and 155 to the −18 volt common bus 133. The emitter of pnp transistor 145 is connected to the grounded common bus 129. The collector of pnp transistor 145 is connected through resistor 157 to the −18 volt common bus 133 and connected through resistor 159 to the base of pnp transistor 146. The base of pnp transistor 146 is connected through resistor 161 to the +6 volt common bus 127 and connected through resistor 163 to the collector of pnp transistor 145. The base of transistor 146 is also connected through resistor 167 to a reset odd flip-flop input terminal 169. The base of transistor 146 is also connected through resistor 171, through rectifiers 173 and 175 to reset all input terminals 177 and 179. The base of transistor 146 is also connected through resistor 181 to a select empty-odd input terminal 183.

Point 185 connected to the collector of transistor 146 and to the base of transistor 145 is connected through a rectifier 187, through a resistor 189 to the base of pnp transistor 191.

*Even flip-flop*

The base of pnp transistor 149 is connected through resistor 197 to the +6 volt common bus 127, and is also connected through resistor 199 to common point 201 connected to the collector of transistor 150 and through resistor 203 to the −18 volt common bus 133. The emitter of pnp transistor 149 is connected to the grounded common bus 129. The collector of pnp transistor 149 is connected through resistor 209 to the −18 volt common bus 133 and through resistor 211 to the base of pnp transistor 150. The base of pnp transistor 150 is connected through resistor 213 to the +6 volt common bus 127. The base of transistor 150 is also connected through resistor 215 to the collector of transistor 217, connected through resistor 219 to the reset even input terminal 221, and connected through resistor 223 and through rectifiers 173 and 175 to reset all terminals 177 and 179. The base of transistor 150 is also connected through resistor 225 to the select empty-even terminal 227. The collector of transistor 150 is connected to common point 201 which is connected through resistor 203 to the −18 volt common bus 133 and through rectifier 205, resistor 207 to the base of pnp transistor 209.

*One bit code read circuit*

The second through the seventh bits of the input code are applied to the inputs 101–107 as described hereinbefore. The first bit is applied to terminal 229. The input represents two consecutive numbers and the state of the one bit will determine which of the two consecutive numbers has been read. The read in to the terminals 101–107 sets two flip-flops when the proper input code is obtained but one of these flip-flops will be reset by the one bit read circuitry depending upon the state of the one bit which is applied to terminal 229. Only one flip-flop remains set at the end of the read operation to ultimately produce an output at the odd output terminal 231 or the even output terminal 232. A gate pulse is applied to terminal 233. The signals applied to terminals 229 and 233 are applied through OR rectifiers 235 and 237, respectively, through resistor 239, to the base of pnp transistor 165. The base of transistor 165 is also connected through resistor 241 to the +6 volt common bus 243. The emitter of pnp transistor 165 is connected to a grounded common bus 245. The collector of pnp transistor 165 is connected through resistor 245 to a −18 volt common bus 247. The collector of pnp transistor 165 is also connected, as described hereinbefore, through resistor 163 to the base of pnp transistor 146 in the odd flip-flop 144. The collector of pnp transistor 165 is also connected through resistor 249 to the base of pnp transistor 217. The gate input from terminal 233 is also connected through resistor 251 to the base of pnp transistor 217. The base of transistor 217 is connected through resistor 252 to the +6 volt common bus 243, and the emitter is connected to the grounded common bus 245. The collector of pnp transistor 217 is connected through resistor 253 to the −18 volt bus 247, and through resistor 215 to the base of pnp transistor 150 of the even flip-flop 148.

*Special code read circuit*

This circuit is used to identify the special binary code 0001. It may be modified to identify other binary codes. In this circuit, the second bit is connected to input terminal 255, the third bit is connected to terminal 257 and the fourth bit is connected to terminal 259. The first bit is connected from input terminal 229, through rectifier 261 to point 263 which is connected to the collector of pnp transistor 266. Input terminals 255, 257, and 259 are connected to common point 265 which in turn is connected through resistor 207 to the base of pnp transistor 266. Common point 265 is also connected through diode 209 to the gate input terminal 108. The base of pnp transistor 266 is connected through resistor 269 to the +6 volt common bus 243, and the collector is connected through resistor 271 to a −18 volt common bus 247. Collector of pnp transistor 266 is connected through three silicon diodes 273–275 to common point 277. The output of the transistor 266 is applied to the special code odd and even flip-flops 192 and 280 with the special code odd flip-flop 192 composed of pnp transistors 194 and 195 and the special code even flip-flop 280 composed of transistors 279 and 281. Output of the special code transistor 266 from point 277 is applied through resistor 283 to the base of pnp transistor 194 and through resistor 305 to the base of pnp transistor 279.

*Special code odd flip-flop*

The base of pnp transistor 194 is connected through resistor 285 to the +6 volt common bus 243 and through resistor 287, through resistor 289, to the −18 volt common bus 247. The emitter of transistor 194 is connected to the grounded common bus 245. The collector of transistor 194 is connected through resistor 291 to the −18 volt common bus 247, and connected through resistor 293 to the base of pnp transistor 195. The base of pnp transistor 195 is connected through resistor 295 to the +6 volt common bus 243 and connected through resistor 297 to the collector of transistor 299. The base of pnp transistor 195 is also connected through resistor 301 to the reset odd input terminal 169 and connected through resistor 303 through rectifiers, 173 and 175, to the reset all input terminals 177 and 179. The emitter of pnp transistor 195 is connected to the grounded common bus 245 and the collector is connected through resistor 289 to the −18 common volt bus 247. The collector of transistor 195 is also connected through rectifier 193, through resistor 189 to the base of pnp transistor 191.

*Special code even flip-flop*

The output from transistor 266 is connected through diodes 273–275, as described hereinbefore, through resistor 305 to the base of pnp transistor 279. The base of pnp transistor 279 is also connected through resistor 307 to the +6 volt common bus 243. The base of pnp transistor 279 is also connected through resistor 309, resistor 311, resistor 303, rectifiers 173 and 175, to reset all input terminals 177 and 179. The base of transistor 279 is also connected through resistor 309 and resistor 313 to the −18 volt common bus 247. The emitter of pnp transistor 279 is connected to the grounded common bus 245. The collector of transistor 279 is connected through resistor 315 to the −18 volt common bus 247, and also connected through resistor 317 to the base of pnp transistor 281. The base of pnp transistor 281 is connected through resistor 319 to the collector of pnp transistor 321, through resistor 323 to the reset even input terminal 221, and through resistor 325, rectifiers 173 and 175, to the reset all input terminals 177 and 179. The emitter of pnp transistor 281 is connected to the grounded common bus 245 and the collector is connected through resistor 313 to the −18 volt common bus 247. The collector of pnp transistor 281 is also connected through rectifier 327, resistor 207 to the base of pnp transistor 209.

*Output stage*

The inputs to the base of transistors 191 and 209 from the even and odd flip-flops have been described hereinbefore. The base of pnp transistor 191 is also connected through resistor 329 to a +6 volt common bus 127 and the base of pnp transistor 209 is connected through resistor 331 to the +6 volt common bus 127. The emitters of pnp transistors 191 and 209 are connected to the collector of pnp transistor 333. The emitter of pnp transistor 333 is connected to the grounded common bus 129 and its base is connected to the +6 volt common bus 127 through resistor 335. The base of pnp transistor 333 is also connected through resistor 337 to a gate input terminal 339.

The select odd or even transistors 299 and 321 respectively have been referred to hereinbefore. A signal may be applied to select odd terminal 183, through resistor 341 to the base of pnp transistor 299. The base of transistor 299 is also connected through resistor 343 to the +6 volt common bus 127, its emitter is connected to grounded common bus 129, and its collector is connected through resistor 345 to the −18 volt common bus 133. The collector of transistor 299 is also connected through resistor 297 to the base of pnp transistor 195. The signal from select even input terminal 227 is connected through resistor 347 to the base of pnp transistor 321. The base of transistor 321 is also connected through resistor 349 to the +6 volt common bus 127. The emitter of pnp transistor 321 is connected to the grounded common bus 129 and its collector is connected through resistor 351 to the −18 volt common bus 133. The collector of pnp transistor 321 is also connected through resistor 319 to the base of pnp transistor 281.

*Operation*

This identification circuit is designed specifically to read a binary coded number of up to seven bits from a stage of shift registers 11–17 in FIGURE 1 such as the magnetic core shift registers. A shift register is provided for each binary bit. Each shift register may be in one of two states, one state being termed binary one state, and the other state being termed the binary zero state. In the binary one state the shift register produces a negative signal in the order of −10 volts, and in the binary zero state the shift register produces a relative positive signal at ground potential.

In the identification reader constructed according to this invention the reader reads two binary coded numbers, separated by a binary one. Thus one binary number will have its first bit a binary zero, and the other binary number will have its first bit a binary one.

Figure 3A:
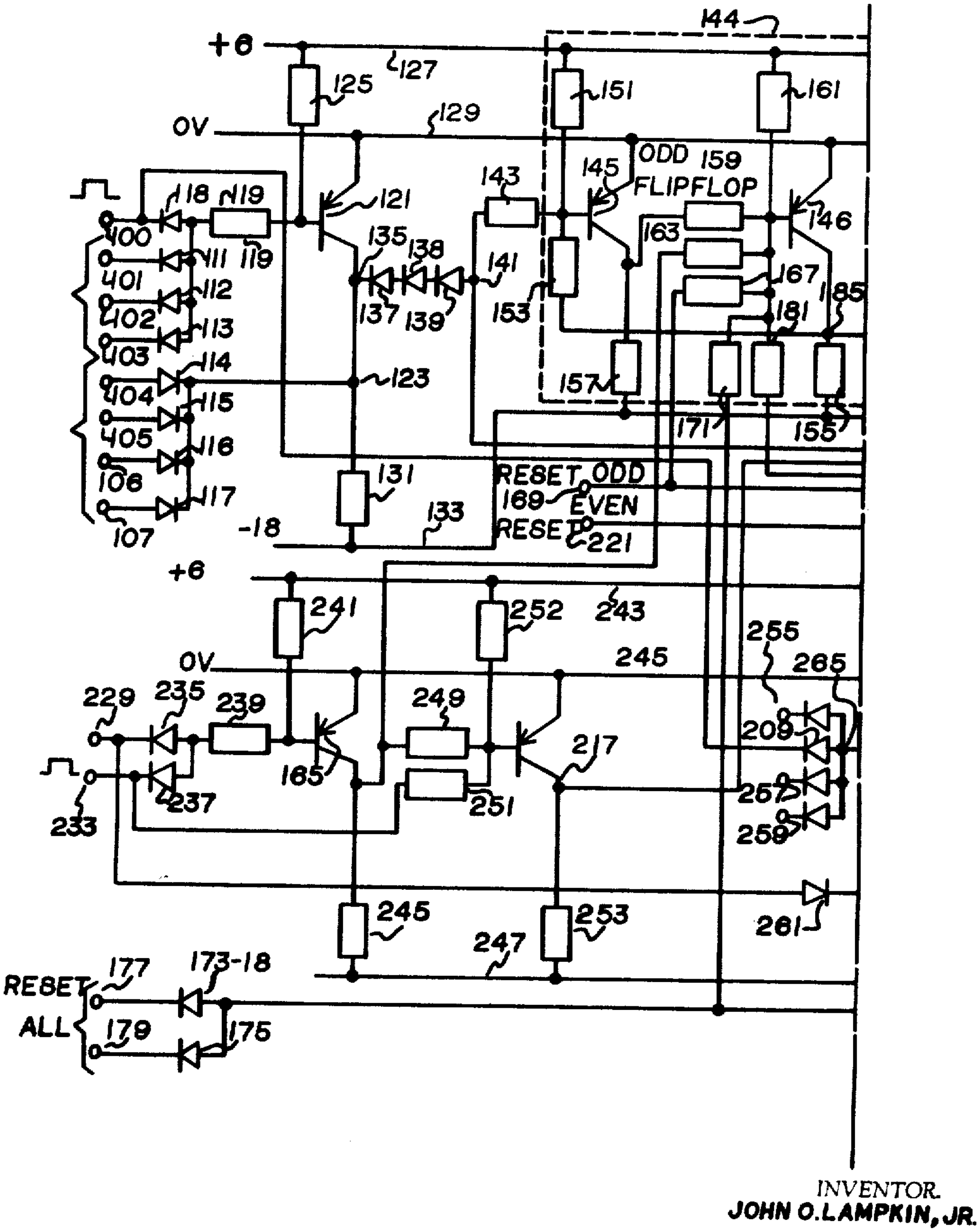
FIGURES 3, 3A, 3B and 3C show the circuit schematic of the identification apparatus.
Figure 3B:
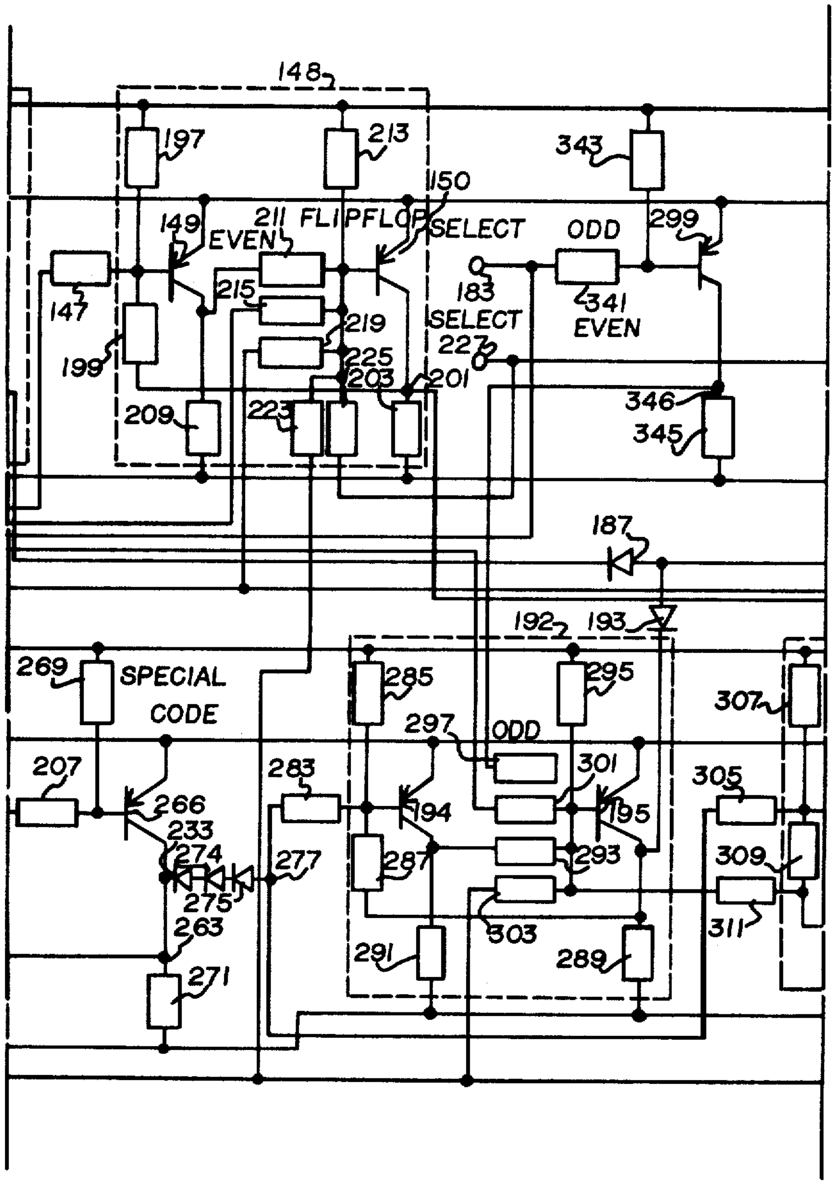
Figure 3C:
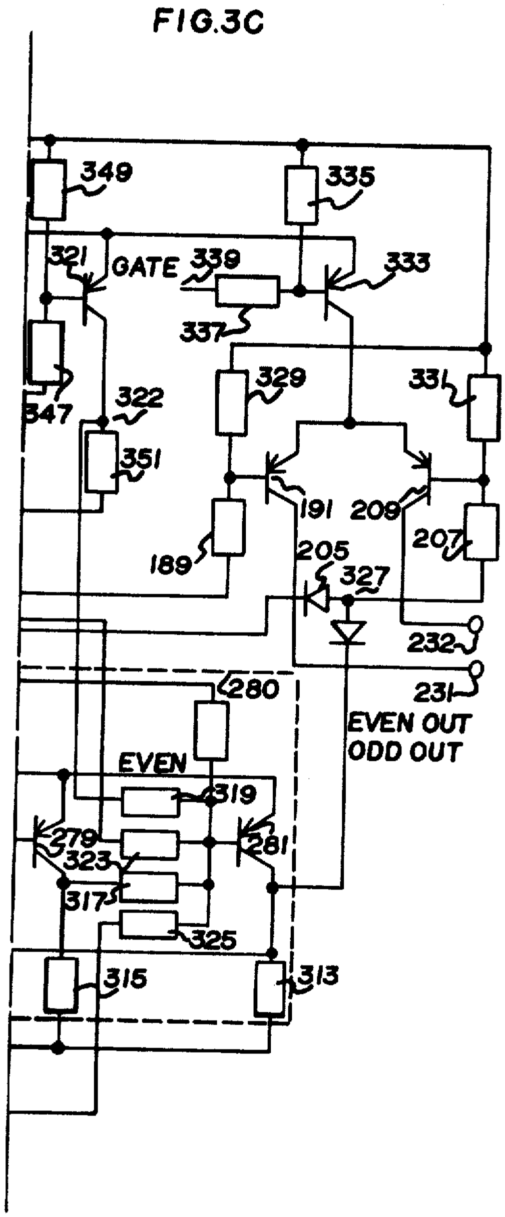
Figure 3:
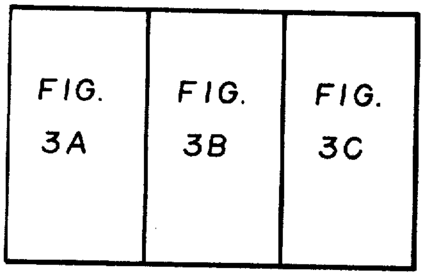

The output from the shift register bit 11 in FIGURE 1, containing the first bit of the binary coded number, is connected to the first bit input terminal 229 in FIGURE 3. The other output terminals from the other shift register bits 12–17 in FIGURE 1 are connected to input terminals 101–107 in FIGURE 3. Those shift register bits that should be in the one state, producing a negative signal, for the desired binary coded number have outputs applied to input terminals 104–107. The shift register bits that should be in the zero state, producing positive signals, for the desired binary coded number have their outputs applied to input terminals 101–103. For instance, to identify the seven bit binary coded numbers 1010011 and 1010010, the first bit rightmost is applied to the first bit input terminal 229, the second, fifth, and seventh bits are applied to terminals 104–107 (not necessarily in that order) and the third, fourth, and sixth bits are applied to terminals 101–103. Thus, negative signals would be applied to terminals 104–107, and positive signals would be applied to terminals 101–103 when the binary coded numbers 1010011 and 1010010 are in the shift register bits being read by the identification logic.

As long as a negative signal is applied to one of the input terminals 101–103, pnp transistor 121 remains turned on so that the collector of the transistor 121 and point 135 are at ground potential.

It is necessary to look at the output from the shift register bits at a predetermined time as described hereinbefore. For this reason, the read circuit is conditioned by a 13 microsecond positive going pulse applied to the gate terminal 108 after the data has been shifted to the shift register bits. Normally a negative signal is applied to terminal 100 to keep pnp transistor 121 turned on so that point 135 is normally at ground potential.

Assume that the positive pulse has been applied to terminal 100 to effect a read operation to forward bias diodes 111–113. At this time also assume that positive signals have been applied to terminals 101–103 from the shift register elements so that a positive signal is applied to the base of pnp transistor 121 turning transistor 121 off.

If a positive signal is applied to any of the terminals 104–107, point 123 will be positive so that the output point 135 will remain positive. Assume for the purposes of this description that one of the binary coded numbers referred above (1010011 or 1010010) was applied to terminals 101–107 at this time so that terminals 104–107 all have negative signals applied thereto at this time. Point 123 therefore becomes negative as pnp transistor 121 is turned off whereupon point 135 goes negative applying a negative output signal through rectifiers 137–139 to the base of pnp transistor 145 in the odd flip-flop 144 turning that transistor on and to the base of pnp transistor 149 in the even flip-flop 148 turning that transistor on.

When transistor 145 turned on, its collection goes positive so that a positive signal is applied from the collector of transistor 145 through resistor 159 to the base of pnp transistor 146 turning pnp transistor 146 off. Assuming all other inputs to its base are positive, pnp transistor 149 in the even flip-flop is turned on so that its collector goes positive applying a positive signal through resistor 211 to the base of pnp transistor 150 turning pnp transistor off. Assuming all inputs to its base are positive, thus, both the odd flip-flop and the even flip-flop have been set to one.

It has been pointed out that the second through the seventh bits of the input code are connected to the input terminals 101–107 so that the bits which should be a binary zero, producing positive signals, have been connected to terminals 101–103 and the bits which should be a binary one, producing negative signals, have been applied to terminals 104–107. This is a code which represents two consecutive numbers. To differentiate between the two binary numbers the output from the first bit is applied to terminal 229. Assume for the purpose of this description that the binary number is 1010011 so that the first bit is a binary "one" applying a negative signal to terminal 229. A 25 micosecond positive gating pulse is applied to terminal 233 at the same time that the 13 microsecond positive gating pulse is applied to terminal 100. This enables transistors 165 and 217 to either be turned on or turned off, so that one of the flip-flops may be reset. The binary "one" negative signal applied to terminal 229 applies a negative signal to the base of pnp transistor 165 turning transistor 165 on. The gating pulse applied to terminal 233 applies a positive pulse to the base of pnp transistor 217 turning that transistor off. The collector of pnp transistor 165 therefore goes positive applying a positive signal through resistor 163 to the base of pnp transitor 146. Pnp transistor 146 has been turned off so it remains turned off and the odd flip-flop 144 remains set to one with pnp transistor 145 still turned on.

With pnp transistor 217 turned off as hereinbefore described, its collector goes negative applying a negative signal through resistor 215 to the base of pnp transistor 150 turning that transistor on. When transistor 150 is turned on, its collector goes positive so that point 201 is positive applying a positive signal through resistor 199 to the base of transistor 149 turning transistor 149 off. Some input through resistor 147 is positive. With transistor 149 turned off, its collector goes negative applying a negative signal through resistor 211 to the base of transistor 150 keeping transistor 150 turned on.

In summary, after reading the code of two consecutive numbers on input terminals 101–107 both the odd and even flip-flops 144 and 148 are set to one. Thereafter, depending upon the condition of the first bit a positive or negative signal is applied to terminal 229 to reset either the odd or the even flip-flops. We have described how the even flip-flop is reset when the one bit is a binary "one." When the one bit is a binary "zero"a positive signal is applied to terminal 229. A positive gate signal is applied to the bases of transistors 165 and 217 from terminal 233. The positive signal applied to the one bit terminal 229 applies a positive signal through resistor 239 to the base of pnp transistor 165 turning that transistor off. Transistor 165 turned off has its collector go negative applying a negative signal through resistor 245 to the base of pnp transistor 217 turning transistor 217 on. Pnp transistor 165 applies a negative signal from its collector through resistor 163 to the base of pnp transistor 146 in the odd flip-flop turning pnp transistor 146 on. The collector of transistor 146 goes positive applying a positive signal through resistor 153 to the base of pnp transistor 145 to turn pnp transistor 145 off. The odd flip-flop is reset and the even flip-flop remains set.

For a description of the operation of the output circuit, first assume that the even flip-flop is set with transistor 149 turned on and transistor 150 turned off. With transistor 150 turned off, its collector applies a negative signal through rectifier 205, through resistor 207, to the base of pnp transistor 209 turning that transistor on at a time that is appropriate. A negative gate output signal has been applied to gate terminal 339 turning pnp transistor 333 on. Transistor 209 will conduct at this time from its collector through output terminal 232, through a load, such as the divert even circuit 23 in FIGURE 1.

If the odd flop-flop is set, with transistor 145 turned on and transistor 146 turned off, the collector of transistor 146 applies a negative signal through rectifier 187, through resistor 189, to the base of pnp transistor 191, turning pnp transistor 191 on. If a negative gate signal is applied to gate input terminal 339, turning transistor 333 on, and transistor 191 will be turned on so that odd output terminal 231 will conduct through a load to a negative bus.

The identification circuit described herein also performs a special function of selecting a special code which might be in addition to the binary code identified as described so far. This special binary code identification in the particular embodiment described herein is a binary 0001.

This selection will be in addition to the output obtained upon the inputs to terminals 101–107. Positive signals applied to the select odd terminal 183 and to the select even terminal 227 causes the special code odd flip-flop 192 and the special code even flip-flop 280 to be reset. The positive signal applied to terminal 183, through resistor 341 to the base of transistor 299 causes transistor 299 to be turned off, so that a negative signal from its collector is applied through resistor 297 to the base of transistor 195 to turn on that transistor and the special code odd flip-flop 192 is reset. The positive signal applied to terminal 227, through resistor 347, to the base of transistor 321, causes transistor 321 to turn off so that a negative signal from its collector is applied through resistor 319 to the base of transistor 281, causing transistor 281 to be turned on, and the special code even flip-flop 280 reset.

Assume that the odd out terminal is to be selected upon the identification of the special code. A negative signal is applied to the select odd terminal 183, applying a negative signal to the base of transistor 299, turning that transistor on. The collector of transistor 299 goes positive, applying a positive signal to the base of transistor 195. The negative signal applied to the select odd terminal 183 is applied through resistor 181 to the base of transistor 146 to turn that transistor on, resetting the odd flip-flop 144 so that the identification code read by input terminal 101–107, and input terminal 229, cannot set the odd flip-flop 144, and cannot select the odd out terminal 231.

To identify the special code 0001, terminal 255 is connected to the output of the second shift register bit 12, terminal 257 is connected to the third from the right shift register bit 13 and terminal 259 is connected to the fourth shift register bit 14.

Terminal 229 is connected to the first or rightmost shift register bit 11. At read time a 13 microsecond signal is applied to terminal 108 applying a positive signal through rectifier 269 to point 265. If the identification code being read is the special code binary number 0001, the second, third, and fourth bits are all binary zeros, and postive signals are applied to terminal 255, 257, and 259. A positive signal is therefore applied to the base of transistor 266. Transistor 266 is therefore turned off, with its collector going negative. The first bit is a binary one, applying a negative signal to terminal 229, through rectifier 261 to point 263. A negative signal is therefore applied through rectifiers 273–275, to the base of transistor 194 and the base of transistor 279.

The even out terminal was not selected so that a negative signal remains applied to the base of transistor 281 in the special code even flip-flop, and special code even flip-flop remains reset, and the application of a negative signal to the base of transistor 279 has no effect. The odd out terminal has been selected, applying a positive signal to the base of transistor 194. The application of a negative signal to the base of transistor 194 turns that transistor on so that its collector goes positive. The collector of transistor 194 therefore applies a positive signal to the base of transistor 195, and as a positive signal is applied to the base of transistor 195 from the base of transistor 299 also, transistor 195 is turned off. The collector of transistor 195 therefore goes negative, applying a negative signal to the base of transistor 194, keeping that transistor turned on. The special code odd flip-flop 192 therefore is set indicating that the special code 0001 has been identified and the odd out terminal 231 is selected.

When the collector of transistor 195 goes negative, it applies a negative signal through rectifier 193 to the base of transistor 191. When a negative gate signal is applied to gate terminal 339, transistor 333 and transistor 191 are turned on so that the odd out terminal 231 conducts through a load to a negative bus. The odd out terminal 231 has been selected.

The even out terminal is selected in a similar manner by applying a negative signal to the select even terminal 227.

In summary a new and improved circuit has been described for identifying predetermined numbers from magnetic core shift registers. The predetermined identification numbers are identified without overloading the cores.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. In a circuit for identifying predetermined binary numbers from a magnetic core shift register, first means connected to all but one bit of the shift register for identifying two predetermined binary numbers different only in the one bit not connected, first indicating means responsive to said first means for indicating the identification of one of the two predetermined binary numbers, second indicating means responsive to said first means for indicating the identification of one of the two predetermined binary numbers, second means connected to the bit of the shift register not connected to said first means for identifying the bit of the shift register not connected to said first means and resetting said first or second indicating means accordingly.

2. In a circuit for identifying predetermined binary numbers from a magnetic core shift register, first means connected to all but one bit of the shift register for identifying two predetermined binary numbers different only in the one bit not connected, first indicating means responsive to said first means for indicating the identification of one of the two predetermined binary numbers, second indicating means responsive to said first means for indicating the identification of the second of the two predetermined binary numbers, second means connected to the bit of the shift register not connected to said first means for identifying such bit and resetting said first or second indicating means accordingly, and means for conditioning said first and second means for a predetermined period of time.

3. In a circuit for identifying predetermined binary numbers from a magnetic core shift register, first means connected to all but one bit of the shift register for identifying two predetermined binary numbers different only in the one bit not connected thereto, first indicating means responsive to said first means for indicating the identification of one of the two predetermined binary numbers, second indicating means responsive to said first means for indicating the identification of the second of the two predetermined binary numbers, second means connected to the bit of the shift register not connected to said first means for identifying such bit and resetting said first or second indicating means accordingly, means for shifting the binary numbers in the shift register, and means responsive to said shifting means for conditioning said first and second means at a predetermined period of time.

References Cited

UNITED STATES PATENTS

| | | | |
|---|---|---|---|
| 2,896,848 | 7/1959 | Miehle | 235—167 |
| 3,151,234 | 9/1964 | Franck | 235—92 |
| 3,278,918 | 10/1966 | Smith | 340—174 |

PAUL J. HENON, *Primary Examiner.*

I. S. KAVRUKOV, *Assistant Examiner.*

U.S. Cl. X.R.

235—92